United States Patent
Regev

(10) Patent No.: US 12,139,252 B2
(45) Date of Patent: Nov. 12, 2024

(54) ASYMMETRIC MULTIROTOR

(71) Applicant: Colugo Systems Ltd., Yavne (IL)

(72) Inventor: Amit Regev, Moshav Bitzaron (IL)

(73) Assignee: Colugo Systems Ltd., Yavne (IL)

( * ) Notice: Subject to any disclaimer, the term of this patent is extended or adjusted under 35 U.S.C. 154(b) by 66 days.

(21) Appl. No.: 17/601,130

(22) PCT Filed: Mar. 29, 2020

(86) PCT No.: PCT/IL2020/050378
§ 371 (c)(1),
(2) Date: Oct. 4, 2021

(87) PCT Pub. No.: WO2020/202143
PCT Pub. Date: Oct. 8, 2020

(65) Prior Publication Data
US 2022/0212784 A1 Jul. 7, 2022

(30) Foreign Application Priority Data

Apr. 4, 2019 (IL) .......................................... 265840

(51) Int. Cl.
*B64C 29/00* (2006.01)
*B64C 3/40* (2006.01)
(Continued)

(52) U.S. Cl.
CPC ............ *B64C 29/0025* (2013.01); *B64C 3/40* (2013.01); *B64C 3/54* (2013.01); *B64C 3/546* (2013.01); *B64C 3/56* (2013.01); *B64C 5/10* (2013.01)

(58) Field of Classification Search
CPC .. B64C 3/40; B64C 3/54; B64C 3/546; B64C 3/56; B64C 29/0025
See application file for complete search history.

(56) References Cited

U.S. PATENT DOCUMENTS

| 1,215,295 A | * | 2/1917 | MacKay | ................... B64C 3/54 244/218 |
| 2005/0242236 A1 | * | 11/2005 | Purcell, Jr. | ................ B64C 5/12 244/87 |

(Continued)

FOREIGN PATENT DOCUMENTS

FR          3064978      10/2018
WO   WO 2018/163156      9/2018
(Continued)

OTHER PUBLICATIONS

International Search Report and the Written Opinion Dated Jun. 18, 2020 From the International Searching Authority Re. Application No. PCT/IL2020/050378. (8 Pages).
(Continued)

*Primary Examiner* — Nicholas McFall
(74) *Attorney, Agent, or Firm* — The Law Office of Joseph L. Felber

(57) ABSTRACT

A multirotor aircraft that comprises a body, at least three motors and at least one wing that is connected to the body. The wing is designed to be folded and unfolded during flight of the multirotor aircraft and designed to change during the flight a low-drag creation position to a lift creation position, and vice versa. At least one motor has a greater motor power than another motor and the distance from the strong motor to the center of gravity of the multirotor aircraft is shorter than the distance from the another motor to the center of gravity. The wing is positioned in the geometric area between the motors.

17 Claims, 6 Drawing Sheets

(51) Int. Cl.
    *B64C 3/54*     (2006.01)
    *B64C 3/56*     (2006.01)
    *B64C 5/10*     (2006.01)

(56) References Cited

U.S. PATENT DOCUMENTS

| | | | |
|---|---|---|---|
| 2017/0057630 A1* | 3/2017 | Schwaiger | B64C 3/385 |
| 2017/0283035 A1* | 10/2017 | Ji | B64C 39/024 |
| 2018/0312251 A1 | 11/2018 | Petrov | |
| 2019/0310660 A1* | 10/2019 | Atamanov | B64C 29/0066 |
| 2020/0239137 A1* | 7/2020 | Regev | B64C 39/024 |
| 2022/0001975 A1* | 1/2022 | Cracknell | B64C 27/08 |
| 2022/0135204 A1* | 5/2022 | Mehrgan | B64C 3/56 244/49 |

FOREIGN PATENT DOCUMENTS

| | | |
|---|---|---|
| WO | WO 2018/163159 | 9/2018 |
| WO | WO 2020/202143 | 10/2020 |

OTHER PUBLICATIONS

Office Action Dated Nov. 1, 2021 From the Israel Patent Office Re. Application No. 265840 and Its Translation Into English. (6 Pages).

* cited by examiner

ASYMMETRIC MULTIROTOR

RELATED APPLICATIONS

This application is a National Phase of PCT Patent Application No. PCT/IL2020/050378 having International filing date of Mar. 29, 2020, which claims the benefit of priority of Israel Patent Application No. 265840 filed on Apr. 4, 2019. The contents of the above applications are all incorporated by reference as if fully set forth herein in their entirety.

FIELD AND BACKGROUND OF THE INVENTION

The present invention refers to an asymmetric multirotor with collapsible and foldable wings. In order to enable stability for a multirotor with wings with VTOL (vertical take-off and landing) ability, it is possible to fold the wing in the unstable stages, which are take-off, landing and hovering, but having folding wings involves several problems. The first is to maintain the stability of the aircraft while the wings are folded. The second is where to store the collapsed wing without interfering the thrusters. The third is opening and deploying them while maintaining the aircraft stability while unfold the wings until fully deployed. This invention provides a solution to those problems by innovative design and new processes.

VTOL (vertical take-off and landing) aircrafts are equipped with wings that allow them to be effective, fly farther and for more time when they fly forward, than an aircraft without wing. The wing which contributes greatly during the flight forward, causes unbearable instability in take-off, landing and hovering in harsh weather or windy conditions which endangers the aircraft its passengers and people on the ground. There are several ways to deal with the problem and one of them is to fold the wings while hovering, take-off and landing and when starting forward flight, the wings deployed, and lift is generated. Folding and opening the wings without the risking the aircraft or affecting the stability of the aircraft requires innovative and original planning.

BRIEF DESCRIPTION OF THE SEVERAL VIEWS OF THE DRAWINGS

The intention of the drawings attached to the request is not to limit the scope if the invention and its application. The drawings are intended only to illustrate the invention and they constitute only one possibility for its implementation.

DETAILED DESCRIPTION OF SPECIFIC EMBODIMENTS OF THE INVENTION

For the purpose of simplicity of wording an aircraft with a wing that take-off and lands vertically will be called "aircraft" or "multirotor aircraft", as well as the propulsion system in the aircraft can be propellers or jet thrust and will be called "motors".

In order to enable the stability of a multirotor aircraft with a wing to take-off and land in windy conditions, the wing can be folded in the unstable stages, which are the take-off/landing or hovering, but there are a number of problems in this combination of multirotor with a folding wing, and so are the patent solution in question.

Figure 1A:
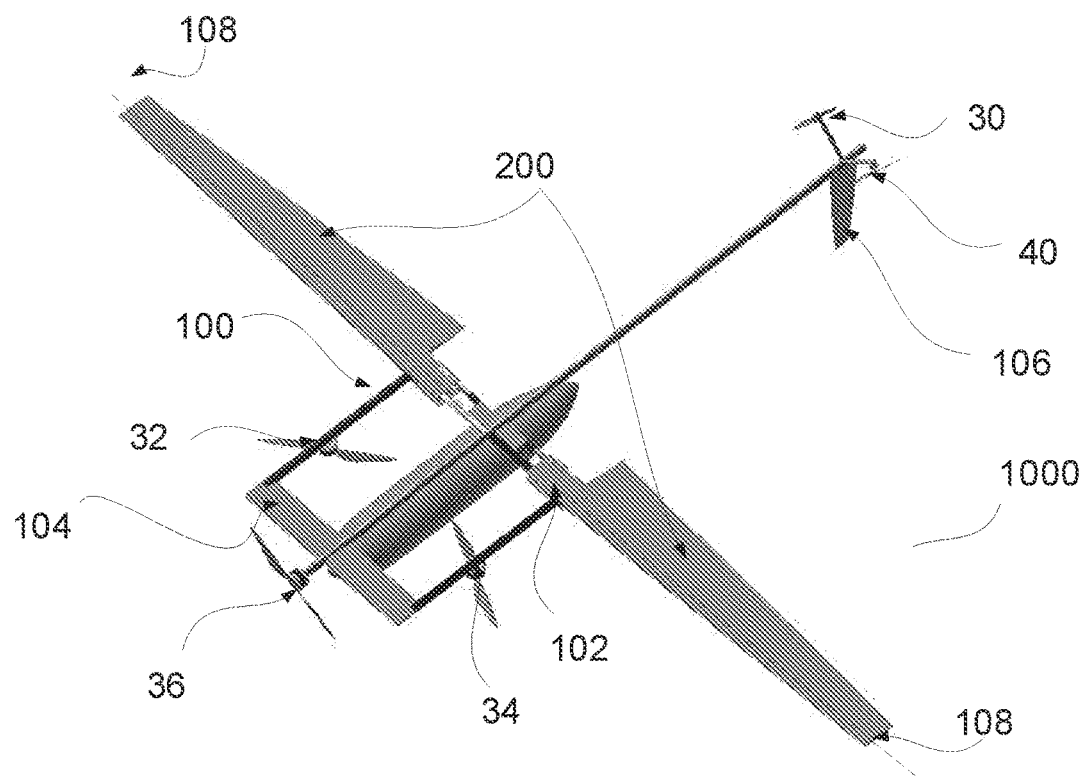
FIG. 1A depicts an aircraft with a rigid loose wing in a locked and deployed mode.
Figure 1B:
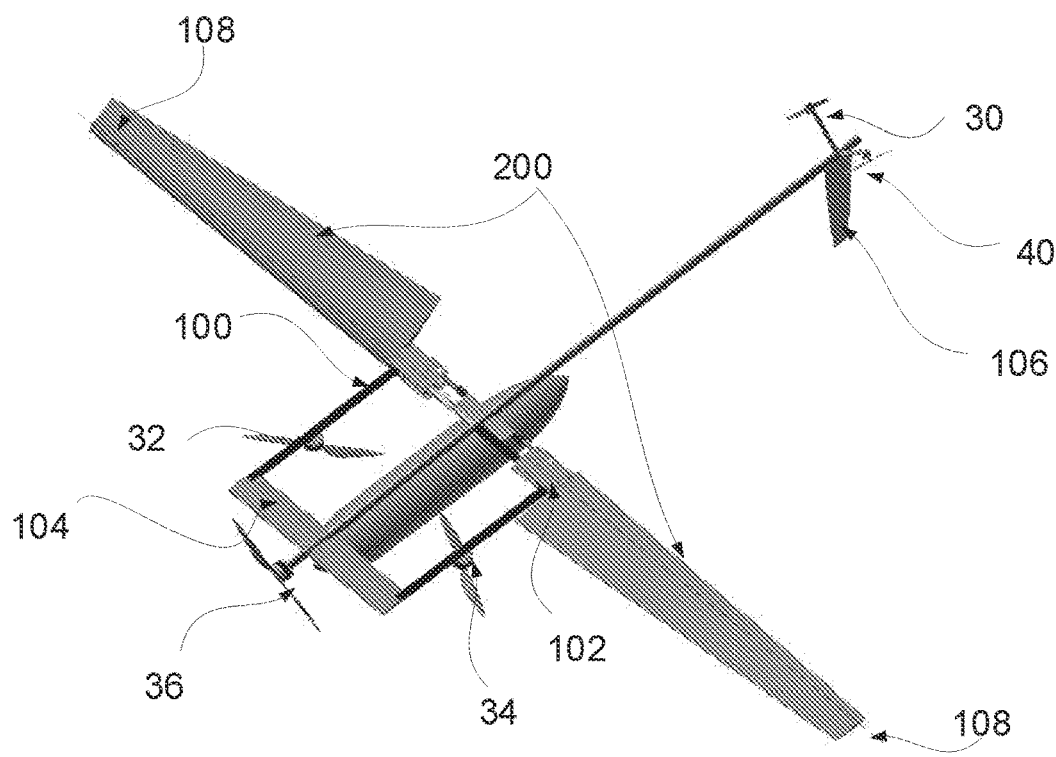
FIG. 1B depicts the aircraft with the rigid loose wing in released state when folding starts.
Figure 1C:
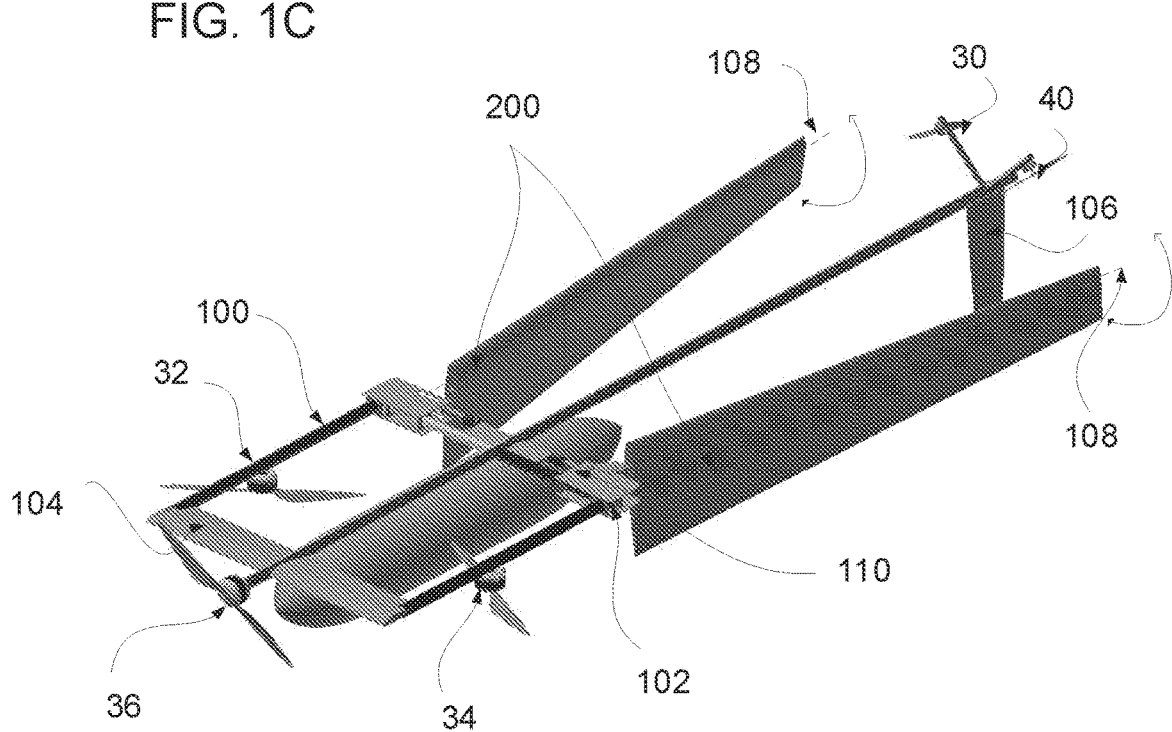
FIG. 1C depicts an aircraft with a rigid loose wing in a folded closed position that runs under the rear propellers.
Figure 1D:
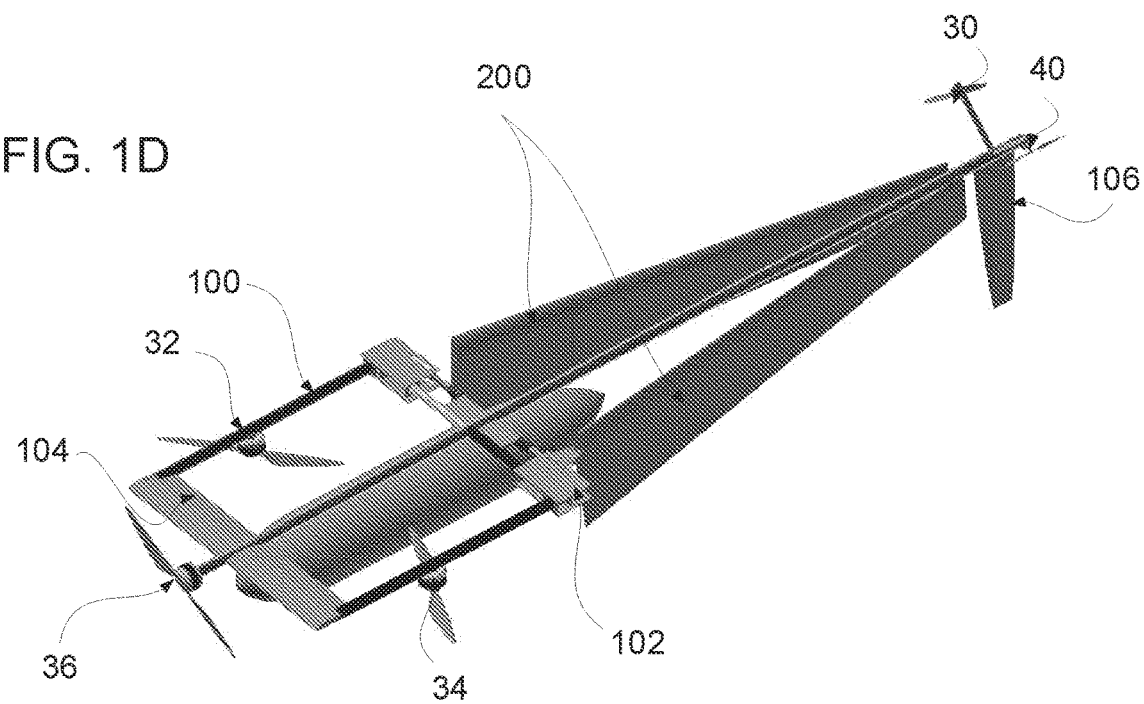
FIG. 1D depicts an aircraft with a rigid loose wing which does not cross the propeller thrust in the folding prosses.
Figure 2A:
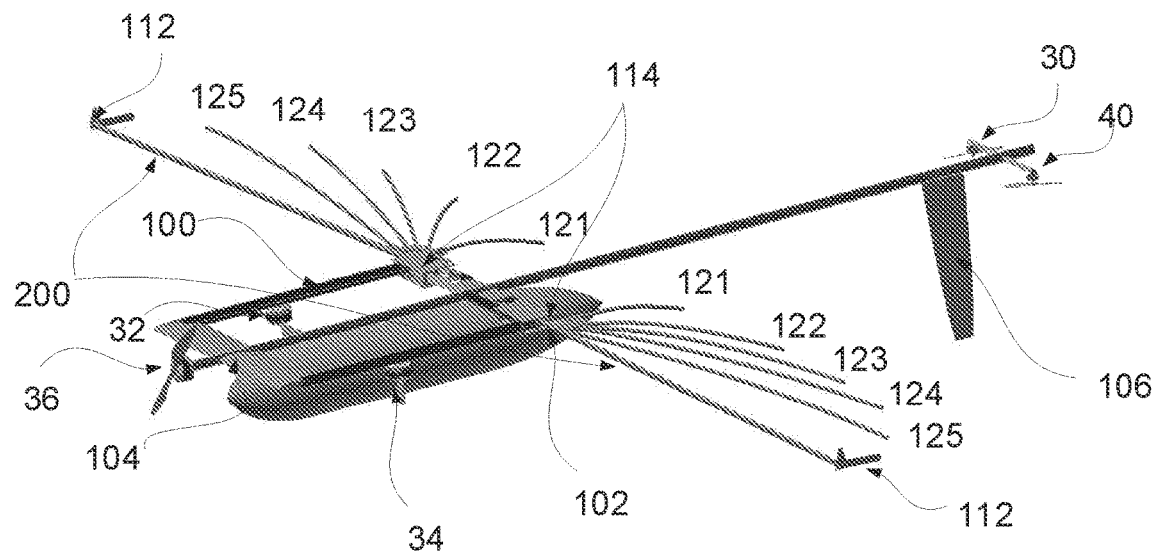
FIG. 2A depicts an aircraft with a sail like wings in a spread and deployed position.
Figure 2B:
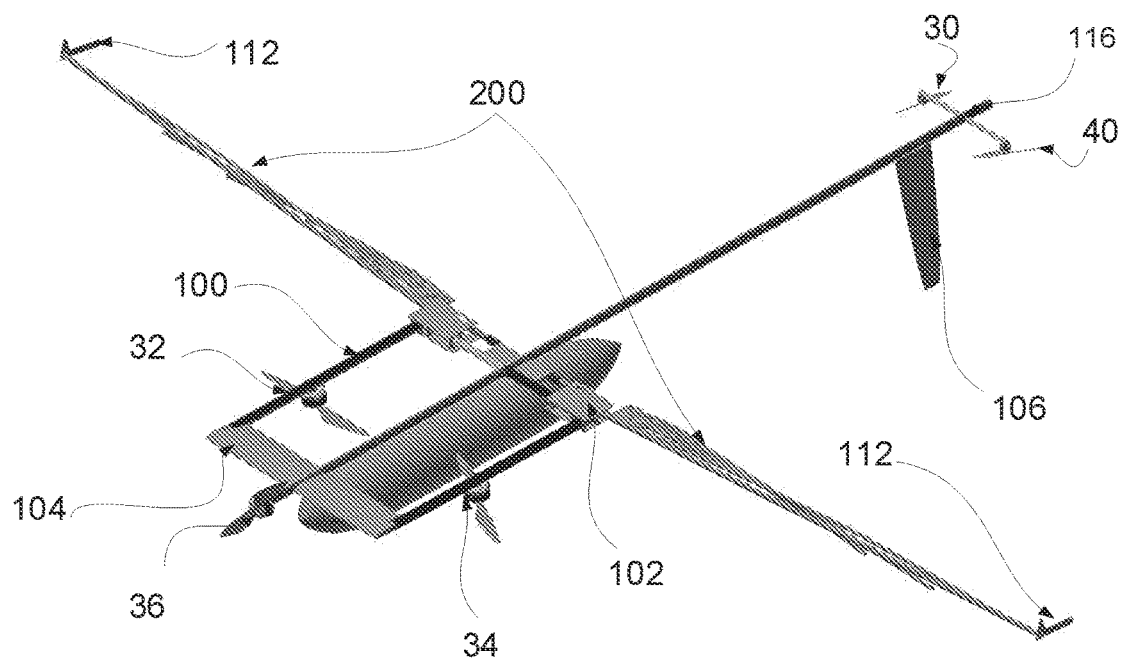
FIG. 2B depicts an aircraft with a sail like deployed wings in a folded position.
Figure 2C:
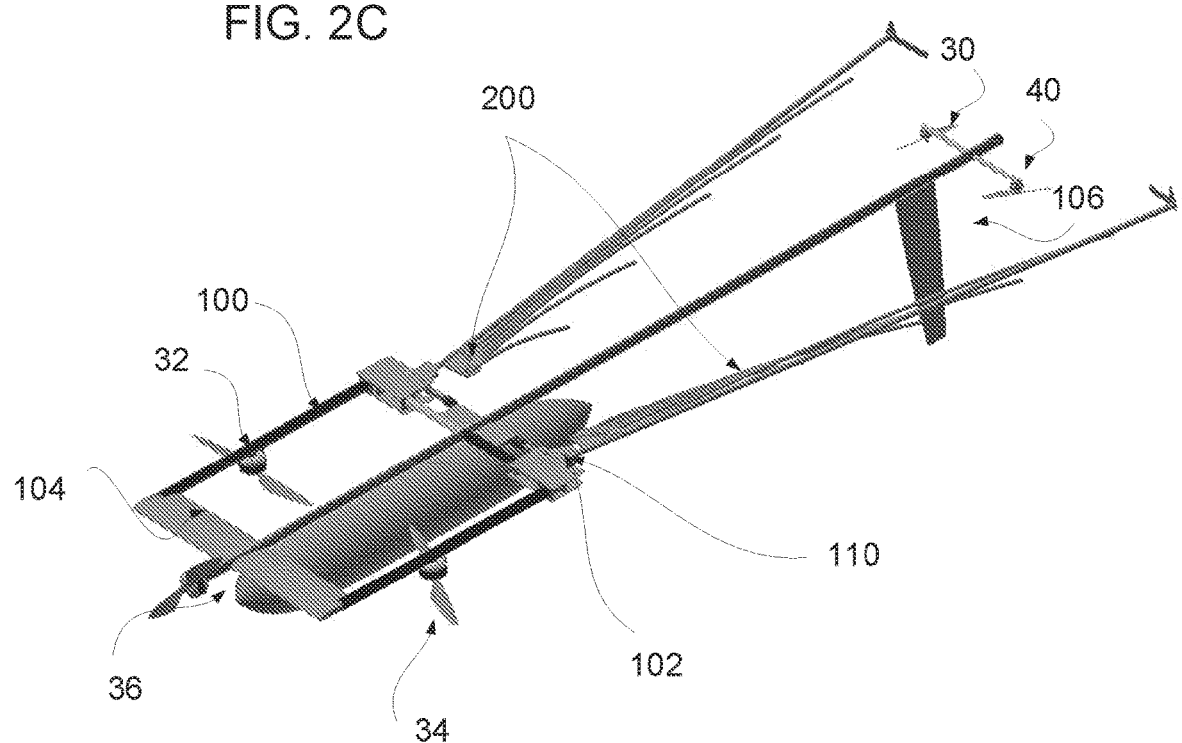
FIG. 2C depicts an aircraft with a sail like wings in a collapsed and folded possession.

The aircraft described in FIGS. 1 and 2 comprises a body (100) to which the wings (200) are connected with a high aspect ratio that can be fold back around folding axis (102), three or four vertical motors of which at least two are stronger (32, 34) that carry most of the weight of the aircraft at take-off or hovering, and control the height, pitch and yaw, at the rear end a motor or multiple motor that are weaker (30, 40) carrying a small portion of the weight and control of the altitude, pitch and yaw and one or more motors (36) that pushes the aircraft forward in a plan configuration only in time of flight forward.

There may even be an aircraft when the vertical motor control all the axis like a standard multirotor.

The aircraft takes-off vertically using the vertical motors (30, 40, 32, 34) then the puller motor (36) begins to operate to start a horizontal flight after a certain speed the wings are deployed and then enter into the deployed mode after aligned into the direction of flight, they are locked or spread and begin to generate lift and then the vertical motors (30, 40, 32, 34) stop working and the aircraft continues to fly as a regular airplane controlled by the control surfaces, stabilizer or the canard (104) which control pitch and rudder (106) who controls the yaw, until it slows down his flight to a speed close to its stall speed and then again the vertical motors (30, 40, 32, 34) begin to work and carry the weight of the aircraft instead of the wings, the wings collapse, the lift is destroyed, the wings folds and the aircraft holts, it is of course possible to fold the wings on the ground.

The stabilizers are with a relatively small area compared to the power of the vertical motors so they are less interfere with the stability of the aircraft in windy conditions but also can be folded, it is even possible make a wing and stabilizers collapsible together with the same mechanism.

The folding and deploying of the wings may relatively takes a long time, and it can interfere with the stability if the aircraft in the transition phase and even can endanger the aircraft and its passengers, that is why in this patent the deploying of the wings will be done in two stages, the first stage will be to destroy the lift or the drag and the second stage will be the folding of the wing, when the aircraft fly's forward the entire wing will be deployed and then spread to generate lift, because the wing does not interfere with the flight when it collapses or spreads it is possible to open the wings in all stages of flight, although there is a priority for low speed since gaining lift too quickly may overload the structure of the aircraft.

Whereas wings are usually a large and significant area of the aircraft, they may interfere with the air flow of the motors when they are passing under the thrusters and can interfere with the stability of the aircraft and even endanger it and its passengers, connecting the wing above the propellers will create a high aircraft with propellers close to the ground which may endanger the aircraft surrounding and damage themselves by foreign objects, thus folding the wings with this patent is designed so that it does not interfere with the flow from the thrusters when the wings fold, because the wings does not pass under the propellers flow or because when is passes, it is at minimum drag and so does not interfere when there is no wind resisting the trusts flow.

FIG. 1A depicts the aircraft with two wings (200) at a deployed position with the wings that are locked around the longitudinal axis (108) compared to FIG. 1B where the wings (200) are locked relative to the folding axis (102) but not in a locked position relative to the longitudinal axis (108), and so it is able to turn freely and so effect of the wind on the wing is much smaller and dos not disturbs the aircraft stability, in the folding of the wing around the folding axis (102) it can stop before the rear motors thrust (30, 40) and be in a loose mode as described in FIG. 1C or to pass before the motors and can be in a locked or partially locked when they are close to one another like in FIG. 1D. When the wings are open or spread the aircraft can advance forward by engaging the pusher motor or puller motor (36) and the wings are still loose, and so the wings align horizontally and in a natural condition for flight and thus it is easier and more convenient to lock them, the lock is carried out by moving the lock lead that begins in the area of the longitudinal axis (108) where the thickness of the profile is relatively similar when the wing is relatively horizontal and can be slide in and out along the wing profile up to the point in which the wing can't turn around its axis, in the locked state the control surfaces need to be reversed and work as an ailerons and not as a stabilizer like they were when the wing was in the loose state, of course the wings could also fold to the end of the rear motors when they are positioned further and wing does not reach them.

Figure 4A:
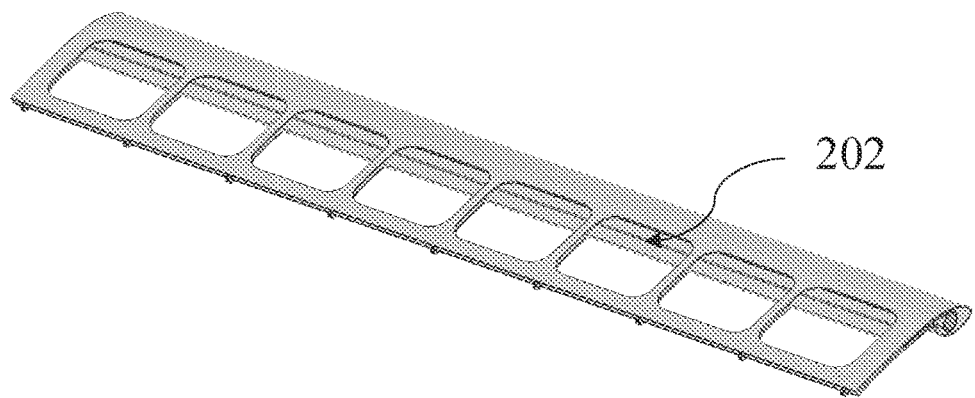
FIG. 4A depicts a wing with a rolled-up sail
Figure 4B:
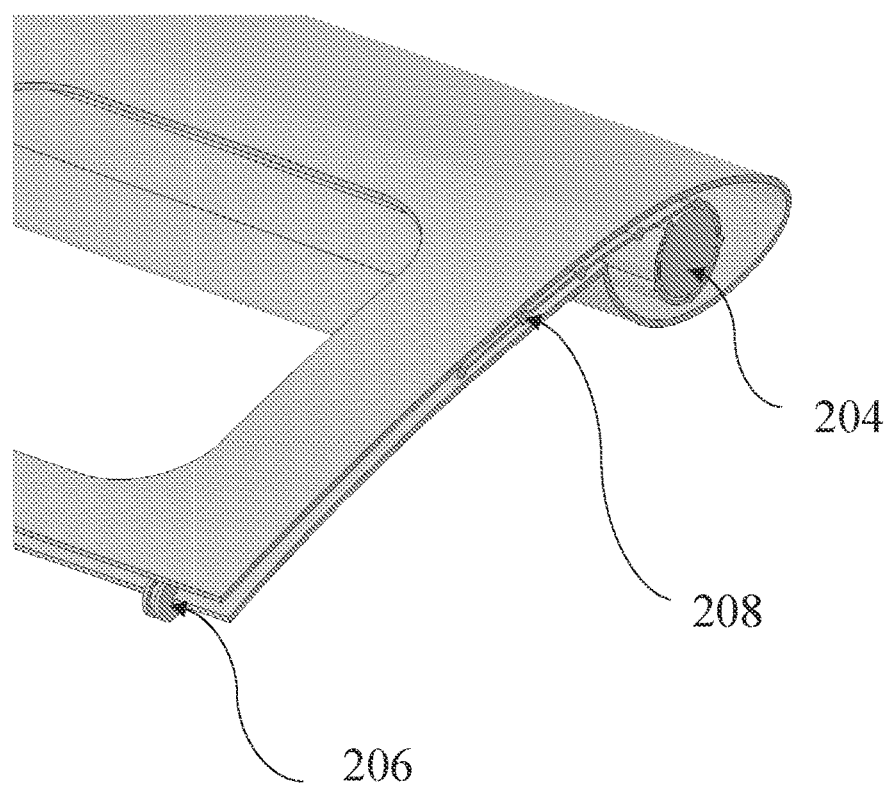
FIG. 4B depicts a description of components of a rolled-up wing

The same goes for FIG. 2 that describes one of the many designs for spread wings (200) which is built from a number if segments (121, 122, 123, 124, 125) and they are connected to a fabric sail, when entering forward flight, the sail is stretched by pulling the first segment closest to the body (100) with a motor a cable or with a piston and with it all the other segment open with it and the sail is spread and the wing starts generating lift, the wind is controlled with a steering link (112) that is operated with a servo or other kind of actuator, this link also spreads the flaps of the wing, which is used as a balancer by changed the flow thus controlling the roll of the aircraft, as opposed to hovering in which for example the last segment (121) is released and then wing collapses and is folded quickly with or without the help of springs or rubber bands or other pneumatic or hydraulic mechanism (114) that helps to a faster fold, and thus remains a thin wing spur that does not produce lift or drag that may interfere with the aircrafts stability while hovering or during takeoff and landing, and thus the speed at which the wing (2C) fold is no so relevant because it is no longer a disturbance, there may be a rolled up wing like in FIG. 4A similar to a sail of a ship that folds like a blind (202) with a reinforcement (208) along the length of a main spur (204) with the spread and collapse of the wing with a cable that runs around a reel (206) that appears in FIG. 4B that are powered by motors that turn the main spur or the reel or both.

The decreasing of the lift can also be carried out during the folding process of the wing, rather than only the open position, but also in a condition that wings are fully folded on the side of the body. When the wings collapse and do not produce lift or drag before the fold they allow the folding of the wing forward so that it will enable designs of aircrafts with a tandem and canard, which one wing will deployed backwards and the other forward.

The collapse or release of the wings allows the wings to pass under the flow coming from the thrusters because then they are at a state where the wings area has been reduced to a negligible are of the rods and thus, they block less of the flow from the thrusters. Although when there is wind, there is a clash between the influence of the atmospheric wind and the effect of the thrust of the motors on the wing, which causes instability and therefore not recommended, and there for is necessary to refrain from this transition that causes a particular instability, especially if the wind is from a different direction that may cause a clash between the two forces (thruster and the wind) when it comes to a loose wing like the one on FIG. 1 and not a sail wing.

Figure 3:
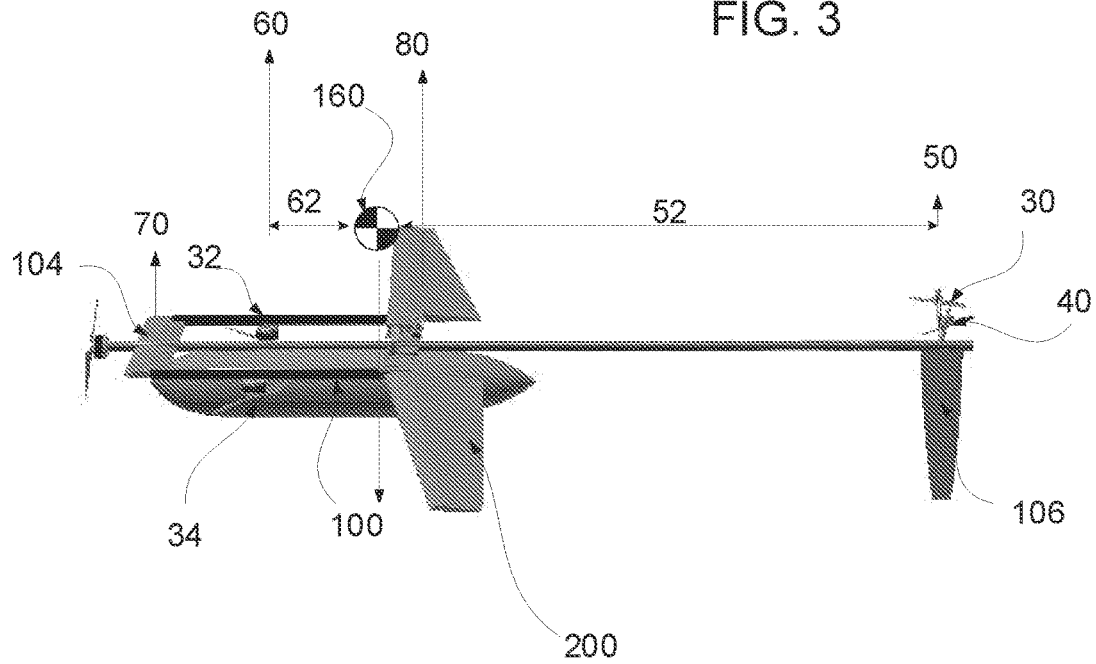
FIG. 3 depicts a diagram of torque and force distribution on the airplane and on the multirotor.

The collapse of the lift wing and been in a low drag position allows the wings to fold upward above the motors, and so the motors can be at the same height and at a satisfying height in relation to the ground and without the need for the moving farther of the rear motors to allow room for the wings and still be stable in hovering since the wing are in low drag position The aircraft described here has a pair of large motors in the front and a motor or a pair of motors relatively small located in the rear, the center of gravity is a critical and crucial factor and if it is not in the right place it can bring about crushing the aircraft, since the aircraft in this invention is a combination of a multirotor and a fixed wing seen in FIG. 3 of the aircraft that the two combined aircraft have a common center of gravity, and since the light weight wing the effect of the fold is negligible.

An aircraft with a single wing with a high aspect ratio has a great advantage when it comes to the efficiency and flight time in such a case when its needed to fold the wing it might be beneficial to avoid passing the wing under the air flow of the thrusters and thus requires the location of the motors below and close to the ground, which lifts a lot of dust and risks the surroundings, and so it is required to move the rear motor or motors farther.

While hovering as shown on FIG. 3 the motors are placed so the sum of the forces (50, 60) are have the same moment to the arms (52, 62), but the center of gravity is not located at the center of the forces, and so some of the motors can possibly waist more energy and the rest less and thus, inefficiencies are created, in FIGS. 1, 2 and 3 we can see that the motors (30, 40) are farther from the center of gravity (160) compared to motors (32, 42) which are closer to the center of gravity, meaning that to generate zero torque required less force (50) in motors (30, 40) compared to (32, 42) the force there (60) is of greater magnitude depending on the length of the arms (52) compared to the long arm (60) so this asymmetric configuration is necessary to allow a smoother transition between hover and flight mode.

In FIG. 1 the rear motors (30, 40) which are located in an angle of 45 degrees in a relation to the body, in a configuration called Multi-Rotor V, and they control the yaw of the aircraft, this motors have a small diameter is possible and a fast rotation speed to allow as a large force to take advantage of the small area to allow a smallest aircraft as possible.

The motors (30, 40) can be replaced with a single motor that moves around an axis with a servo, such as in a standard tri-copter configuration or a with a pair of horizontal motors described in FIG. 2 which revolve around the axis (116) to rotate the aircraft.

Figure 5:
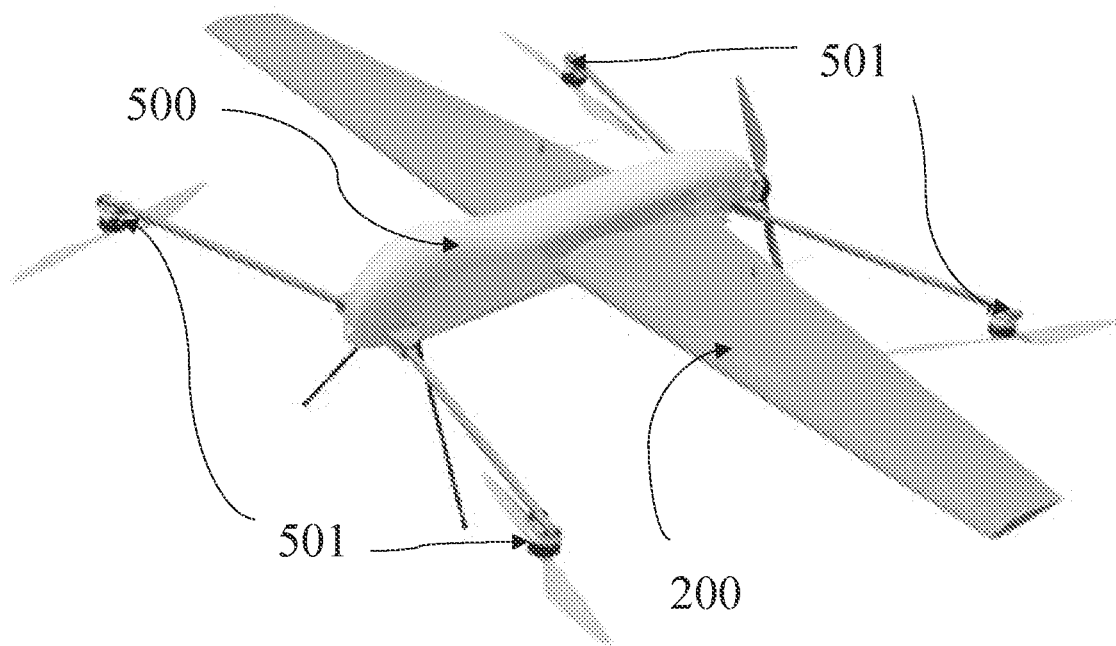
FIG. 5 depicts the multirotor aircraft (500)

As understood from the explanations above and from the drawings, the present invention refers to a multirotor aircraft (500) that includes a body (100), at least three motors (500) and at least one wing (200) that is connected to the body. The multirotor aircraft may include four motors as depicted for example in the drawings and also in FIG. 5 that depicts the multirotor aircraft (500). The multirotor aircraft (500) may include one wing or several wings for example two wings (200) as depicted in the drawings. The wing (200) is designed to be folded and unfolded during flight of the multirotor aircraft. The term "folded" in this connection is illustrated for example in FIGS. 1C, 1D and 2C in which the wings are in a folded position when they are not in use for creating lift, and the term "unfolded" is illustrated for example in FIGS. 1A, 1B and 2A in which the wings are in an unfolded position when they are ready to be in use for creating lift.

The wing (200) is also designed to change during the flight a low-drag creation position to a lift creation position, and vice versa. When the wing is in the unfolded position it can be in a state that creates lift, for example as illustrated in FIG. 1A when the wing is a type of free wing that can rotate around its longitudinal axis freely according to the wind acting on it and when the wing is in a loose connection state with the body then it is in the low-drag creation position as illustrated for example in FIG. 1B, because that there are no efficient lift at that position. But when the wing is locked and fixed to the body as illustrated for example in FIG. 1A the wing is then functions as a fixed wing and can creates lift.

There are many possible ways to design the wing for being capable to change positions during the flight from the low-drag creation position to the lift creation position. For example, the free wing as explained above and also the wings that are illustrated in FIG. 2A that depicts a wing with a frame like fingers that can be covered by a sheet that spreads on the frame and by that enable the wing to create lift or to un-spread the cover sheet and to change the position of the wing to the low-drag creation position. The same is regarding the wing that is depicted in FIGS. 4A and 4B in which the cover sheet can cover the holes in the wings and uncover them.

The present invention refers to the multirotor aircraft (1000) that includes the body (100), at least three motors (32)(34)(30)(40) and at least one wing (200) as described above that is designed to be folded and unfolded during flight and to change the low-drag creation position to the lift creation position, and vice versa. At least one motor (32) out of said at least three motors has a greater motor power than at least another one motor (30) out of said at least three motors. The distance from the at least one motor (32) to the center of gravity of the multirotor aircraft is shorter than the distance from the at least another one motor (30) to the center of gravity. In that way, it is possible to position the week motors (30) (40) in a longer distance from the center of gravity and by that to have more geometric area between the motors in which it is possible to position the wing. In this way, the multirotor aircraft (1000) will not yaw due to the fact that the momentum of the week motors (30)(40) with the long distance to the center of gravity can be same as the momentum of the strong motors (32)(34) with the shorter distance to the central of gravity. It is possible to have two strong motors and two week motors or any other kind of combination.

What is claimed is:

1. A multirotor aircraft comprising a body, at least three motors and at least one wing that is connected to the body; said at least one wing being transitionable during flight of the multirotor aircraft between a low drag creation state and an lift generating state and; wherein at least one motor out of said at least three motors has a greater motor power than at least another one motor out of said at least three motors; wherein a distance from the at least one motor to a center of gravity of the multirotor aircraft is shorter than a distance from the at least another one motor to said center of gravity; and wherein a root of the at least one wing is positioned in a geometric area between the at least three motors.

2. The multirotor aircraft according to claim 1, wherein when said at least one wing is in said low-drag creation state the at least one wing is in a loose connection state with the body and adapted to rotate freely along the longitudinal axis of the at least one wing, and when said at least one wing is in said lift creation state the at least one wing is in a fixed connection state with the body.

3. The multirotor aircraft according to claim 1, wherein when said at least one wing is in said low-drag creation state the at least one wing is in a non-spread state and when said at least one wing is in said lift creation state the at least one wing is in a spread state.

4. The multirotor aircraft according to claim 1, wherein when said at least one wing is in said low-drag creation state the at least one wing is rolled up and when said at least one wing is in said lift creation state the at least one wing is unrolled.

5. The multirotor aircraft according to claim 1, wherein the at least one wing is rotatable about a folding axis, and wherein transitioning of said at least one wing between the low drag creation state and the lift generation state comprises rotating the at least one wing around the folding axis.

6. The multirotor aircraft according to claim 1, wherein the aircraft further comprises a motor producing horizontal thrust.

7. The multirotor aircraft according to claim 6, wherein the aircraft further comprises a stabilizer.

8. The multirotor aircraft according to claim 7, wherein the stabilizer is configured to be foldable.

9. The multirotor aircraft according to claim 1 wherein said at least one wing comprises a frame having a plurality of finger-like segments.

10. The multirotor aircraft according to claim 9 wherein said plurality of finger-like segments are associated with a sheet or a fabric sail.

11. The multirotor aircraft according to claim 10 wherein when entering forward flight, the at least one wing is stretched by pulling the first segment closest to the aircraft body with at least one of a motor, a cable or a piston, therein allowing the other segments to open simultaneously with the first segment thereby allowing the sheet or fabric sail to spread to allow the at least one wing to generate lift.

12. The multirotor aircraft according to claim 9 further comprising a steering link that is controlled with an actuator, wherein said steering link is configured to spread the flaps of the at least one wing.

13. The multirotor aircraft of claim 9 further comprising at least one actuator selected from a spring, a rubber band, a pneumatic mechanism, a hydraulic mechanism, or any combination thereof, the at least one actuator being functionally coupled to said plurality of finger-like segments.

14. A method of controlling a multirotor aircraft comprising:
providing the aircraft as claimed in claim 1;
providing a control unit adapted to control the at least three motors and the at least one wing of said aircraft such that:

during takeoff of the aircraft the control unit instructs the at least three motors to operate;

during transition to horizontal flight the control unit instructs the at least one wing to unfold by rotating about a folding axis and to deploy or lock;

during transition to one of hovering and landing, the control unit instructs the at least one wing to undeploy or unlock and then to fold around the folding axis.

15. The method according to claim 14, wherein said deploy or lock comprises locking the at least one wing with respect to the longitudinal axis of the at least one wing and said undeploy or unlock comprises unlocking the at least one wing with respect to the longitudinal axis of the at least one wing such that the at least one wing is free to rotate around its longitudinal axis.

16. The method according to claim 14, wherein said deploy or lock comprises spreading of the at least one wing and said undeploy or unlock comprises moving the at least one wing to a non-spread state.

17. The method according to claim 14, wherein said deploy or lock comprises unrolling of the at least one wing and said undeploy or unlock comprises rolling the at least one wing.

* * * * *